(12) United States Patent
Yi

(10) Patent No.: US 11,247,710 B2
(45) Date of Patent: Feb. 15, 2022

(54) CARRIER ADJUSTING MECHANISM AND STROLLER THEREOF

(71) Applicant: Wonderland Switzerland AG, Steinhausen (CH)

(72) Inventor: Xiaolong Yi, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 17 days.

(21) Appl. No.: 16/747,471

(22) Filed: Jan. 20, 2020

(65) Prior Publication Data

US 2020/0239057 A1    Jul. 30, 2020

(30) Foreign Application Priority Data

Jan. 29, 2019    (CN) .......................... 201910088403.9

(51) Int. Cl.
| | |
|---|---|
| *B62B 7/06* | (2006.01) |
| *B62B 7/08* | (2006.01) |
| *B62B 9/08* | (2006.01) |
| *B62B 9/26* | (2006.01) |

(52) U.S. Cl.
CPC ................ *B62B 7/062* (2013.01); *B62B 7/08* (2013.01); *B62B 9/08* (2013.01); *B62B 9/26* (2013.01); *B62B 2202/42* (2013.01)

(58) Field of Classification Search
CPC .......... B62B 7/062; B62B 7/08; B62B 7/147; B62B 7/142; B62B 7/123; B62B 7/14; B62B 9/08; B62B 9/26; B62B 2202/42
See application file for complete search history.

(56) References Cited

U.S. PATENT DOCUMENTS

| | | | | |
|---|---|---|---|---|
| 9,962,011 | B1* | 5/2018 | Eyman ..................... | B62B 9/142 |
| 2010/0001492 | A1* | 1/2010 | Driessen ................ | B62B 7/142 |
| | | | | 280/642 |
| 2013/0113185 | A1* | 5/2013 | Zehfuss ................. | B62B 7/142 |
| | | | | 280/647 |
| 2013/0113188 | A1* | 5/2013 | Liao ......................... | B62B 7/08 |
| | | | | 280/650 |

(Continued)

FOREIGN PATENT DOCUMENTS

| | | | |
|---|---|---|---|
| EP | 2 937 262 | A2 | 10/2015 |
| GB | 2 449 999 | A | 12/2008 |
| GB | 2553802 | A | 3/2018 |

*Primary Examiner* — Erez Gurari
(74) *Attorney, Agent, or Firm* — Winston Hsu

(57) ABSTRACT

A carrier adjusting mechanism is applied to a stroller including a stroller frame and a carrier and includes a base, a locking structure, a locking device, and a release actuator. The base is connected to the stroller frame. The locking structure is connected to the carrier and pivoted to the base. The locking device is disposed between the base and the locking structure. The locking device includes a first engaging structure, a second engaging structure, and a locking member. The locking member is engaged with the first engaging structure at a first position or the second engaging structure at the second position. The release actuator is disposed on the stroller and connected to the locking device for disengaging the locking member from the first engaging structure or the second engaging structure, to allow the locking structure to move between the first position and the second position together with the carrier.

28 Claims, 12 Drawing Sheets

(56) References Cited

U.S. PATENT DOCUMENTS

| | | | | |
|---|---|---|---|---|
| 2015/0042056 A1* | 2/2015 | Sparling | ................ | B62B 7/145 |
| | | | | 280/47.35 |
| 2017/0297599 A1* | 10/2017 | Zhong | ................... | F16B 12/06 |
| 2017/0334476 A1* | 11/2017 | Paxton | ................ | A47D 13/025 |
| 2018/0312188 A1* | 11/2018 | Haut | ...................... | B62B 7/142 |
| 2018/0327015 A1* | 11/2018 | Yuan | ....................... | B62B 9/24 |
| 2020/0172143 A1* | 6/2020 | Zhong | ................... | B62B 7/068 |
| 2020/0239057 A1* | 7/2020 | Yi | .......................... | B62B 7/147 |
| 2020/0331510 A1* | 10/2020 | Kim | ...................... | A47D 15/00 |
| 2020/0406950 A1* | 12/2020 | Wu | ......................... | B62B 7/04 |

\* cited by examiner

CARRIER ADJUSTING MECHANISM AND STROLLER THEREOF

BACKGROUND OF THE INVENTION

1. Field of the Invention

The present invention relates to a carrier adjusting mechanism and a stroller thereof, and more specifically, to a carrier adjusting mechanism having a carrier adjusting function for different postures of an infant and a stroller thereof.

2. Description of the Prior Art

Rapid developed economics and technology provide people with various consumer products, such as a stroller. The stroller not only allows an adult to operate it with one hand to reduce his burden when taking an infant out, but also makes the infant sit thereon comfortably. Thus, the stroller has become more and more popular in infant caring.

In general, the stroller is usually composed of a stroller frame and a carrier (e.g. a safety seat or a bassinet) assembled with the stroller frame for holding the infant. The carrier is detachably connected to the stroller frame for different postures (e.g. a lying or sitting posture) of the infant.

However, there exist several problems in the conventional stroller design. First, it is necessary to utilize different kinds of carriers (e.g. a safety seat or a bassinet) for different postures of the infant in the stroller. Secondly, the assembly and disassembly processes of the carrier needs to be perform frequently when the infant's posture is changed to another different posture, so as to cause the user much inconvenience in operating the carrier.

Thus, it is necessary to design a stroller having a carrier adjusting function for different postures of the infant to solve the aforesaid problems.

SUMMARY OF THE INVENTION

An intended purpose of the present invention is to provide a carrier adjusting mechanism for adjusting a carrier from one mode to another mode according to different postures of an infant to reduce a user's burden when taking the infant out.

Another intended purpose of the present invention is to provide a stroller having a carrier adjusting mechanism.

For achieving the aforesaid purposes, the carrier adjusting mechanism of the present invention is applied to a stroller for providing a carrier adjusting function. The stroller includes a stroller frame and a carrier. The carrier adjusting mechanism includes a base, a locking structure, a locking device, and a release actuator. The base is connected to the stroller frame. The locking structure is connected to the carrier and pivoted to the base to be rotatable at least between a first position and a second position relative to the base. The locking device is disposed between the base and the locking structure. The locking device includes a first engaging structure, a second engaging structure, and a locking member. The first engaging structure and the second engaging structure are disposed on one of the base and the locking structure. The locking member is disposed on the other of the base and the locking structure. The locking member is selectively engaged with the first engaging structure to fix the locking structure at the first position or engaged with the second engaging structure to fix the locking structure at the second position. The release actuator is disposed on the stroller and connected to the locking device for driving the locking member to be disengaged from the first engaging structure or the second engaging structure, so as to allow the locking structure to move between the first position and the second position together with the carrier.

Preferably, a top portion of the base abuts against the locking structure, the locking member is a protruding block, and the first engaging structure and the second engaging structure are slot structures for cooperatively forming the top portion of the base.

Preferably, the release actuator is connected to the locking device via a link member, a first end of the link member is fixedly connected to the release actuator, and a second end of the link is fixedly connected to the locking member.

Preferably, the carrier adjusting mechanism further includes a guiding structure disposed on the locking structure, and a portion of the link member located between the release actuator and the locking member is disposed around the guiding structure.

Preferably, the guiding structure is a roller, and the portion of the link member located between the release actuator and the locking member is wound on an external periphery of the roller.

Preferably, the release actuator is disposed on a top end of a backrest tube of the carrier, and the link member is disposed through the backrest tube and the one of the locking structure and the base.

Preferably, the locking device further includes a driving member disposed in the locking structure or the base, the locking member is movably disposed on the driving member, the release actuator is connected to the driving member, and the release actuator drives the locking member via the driving member to be disengaged from the first engaging structure or the second engaging structure.

Preferably, the driving member and the locking member are slidable relative to each other, and a sliding direction of the driving member is intersected with a sliding direction of the locking member.

Preferably, a long slot is formed on one of the driving member and the locking member and is oblique relative to the sliding direction of the one of the driving member and the locking member, the other of the driving member and the locking member has a protruding portion, and the protruding portion is slidably disposed in the long slot.

Preferably, the long slot is a linear slot, and the protruding portion is a pillar structure.

Preferably, the locking device further includes an elastic member disposed between the driving member and the one of the locking structure and the base, and the elastic member has a tendency to drive the driving member to be engaged with the first engaging structure or the second engaging structure.

Preferably, a first end of the elastic member abuts against a side of the driving member connected to the release actuator, and a second end of the elastic member abuts against the one of the locking structure and the base.

Preferably, the one of the locking structure and the base has a protruding pillar, and the protruding pillar abuts against the second end of the elastic member.

Preferably, the carrier adjusting mechanism further includes a limiting structure disposed between the locking structure and the base for limiting a rotation range of the locking structure relative to the base.

Preferably, the limiting structure comprises a convex portion disposed on the one of the locking structure and the base and a concave portion disposed on the other of the locking structure and the base, the convex portion abuts against a side wall of the concave portion when the locking structure moves to the first position, and the convex portion abuts against another side wall of the concave portion when the locking structure moves to the second position.

Preferably, the concave portion is a slot structure extending in a rotation direction of the locking structure, and the convex portion is a rib structure.

Preferably, the concave portion and the first engaging structure cooperatively form the top portion of the base and are overlapped with each other.

Preferably, the carrier adjusting mechanism further includes a blocking member disposed on the locking structure and movable relative to the locking structure between a blocking position and a releasing position, and the blocking member blocks the locking device from performing a releasing motion when the blocking member is located at the blocking position.

Preferably, the blocking member includes a board disposed on the locking structure, an elastic arm formed on the board, and a blocking head protruding from the elastic arm, and the elastic arm has a tendency to drive the blocking head to the releasing position.

Preferably, the blocking member is pushed from the releasing position to the blocking position when an expansion device is engaged with the carrier.

Preferably, the expansion device is a safety seat or a diaper table.

Preferably, the blocking member moves toward the locking device when moving from the releasing position to the blocking position.

Preferably, a first protruding end of the blocking head extends close to the locking device, and a second protruding end of the blocking head extends away from the locking device.

Preferably, the blocking member is slidably disposed through the locking structure.

Preferably, the release actuator is a rotation button, a press button, or a push button.

Preferably, the base is directly connected to the stroller frame or is connected to the stroller frame via an adapting structure on the stroller frame.

For achieving the intended purposes of the present invention, the stroller of the present invention includes a stroller frame, a carrier for holding an infant, and the aforesaid carrier adjusting mechanism.

Preferably, the base is detachably disposed on the stroller frame.

Compared with the prior art, the carrier adjusting mechanism of the present invention adopts the design in which the locking device is disposed between the base and the locking structure for locking the locking structure on the base or releasing the locking structure from the base via linkage of the release actuator, the base, the locking structure, and the locking device. The locking device includes the locking member, the first engaging structure, and the second engaging structure, and the locking member is selectively engaging with the first engaging structure or the second engaging structure to lock the locking structure on the base. The release actuator is connected to the locking device for driving the locking member to be disengaged from the first engaging structure or the second engaging structure, so as to release the locking structure from the base. Since the locking structure is pivoted to the base via a shaft to be rotatable at least between the first position and the second position relative to the base, a position of the carrier can be adjusted via rotation of the locking structure relative to the base after the locking structure is released from the base. In summary, the stroller of the present invention adopts the design in which the carrier adjusting mechanism is disposed between the stroller frame and the carrier, the base is disposed on the stroller frame, and the locking structure is connected to the carrier, so as to allow that a user can exert force upon the carrier to rotate the locking structure to the first position or the second position relative to the base when the locking structure is released from the base. As such, the carrier can be switched to the seat mode or the bassinet mode according to different postures of the infant in the stroller. Furthermore, since the carrier can be switched to the seat mode or the bassinet mode via the carrier adjusting mechanism without replacing the carrier, the present invention can improve the operational convenience of the stroller.

These and other objectives of the present invention will no doubt become obvious to those of ordinary skill in the art after reading the following detailed description of the preferred embodiment that is illustrated in the various figures and drawings.

DETAILED DESCRIPTION

The detailed description for preferred embodiments of the present invention is provided with attached drawings as follows.

A stroller of the present invention includes a stroller frame, a carrier for holding an infant, and a carrier adjusting mechanism. Specifically, the carrier includes, but not limited to, a backrest tube and a handrail. The backrest tube could be preferably a head-to-tail tube and the handrail could be preferably a U-shaped structure, but the present invention is not limited thereto. The carrier adjusting mechanism is disposed between the stroller frame and the backrest tube of the carrier. The carrier adjusting mechanism includes a base, a locking structure, a locking device, and a release actuator. The base is connected to the stroller frame. The locking structure is connected to the backrest tube and is pivoted to the base via a shaft to be rotatable at least between a first position and a second position relative to the base. The locking device is disposed between the base and the locking structure. The locking device includes a first engaging structure, a second engaging structure, and a locking member. The first engaging structure and the second engaging structure are disposed on one of the base and the locking structure. The locking member is disposed on the other of the base and the locking structure. The locking member is selectively engaged with the first engaging structure to fix the locking structure at the first position or engaged with the second engaging structure to fix the locking structure at the second position. The release actuator is disposed on the stroller and connected to the locking device for driving the locking member to be disengaged from the first engaging structure or the second engaging structure, so as to allow the locking structure to move between the first position and the second position together with the carrier. Thus, when the locking structure moves between the first position and the second position together with the backrest tube, the carrier can be switched to a seat mode or a bassinet mode correspondingly according to different postures of the infant. In the embodiment that the carrier at least includes the backrest tube and the handrail, an end portion of the handrail could be connected to the locking structure to make the handrail move between the first position and the second position together with the locking structure (but not limited thereto).

It should be mentioned that the present invention is not limited to the following description for the preferred embodiments of the present invention. That is, all the designs in which the carrier adjusting mechanism includes the base, the locking structure, the locking device, and the release actuator and the stroller has the carrier adjusting mechanism disposed thereon may fall within the scope of the present invention, and the present invention is not limited to the following embodiments.

Figure 1:
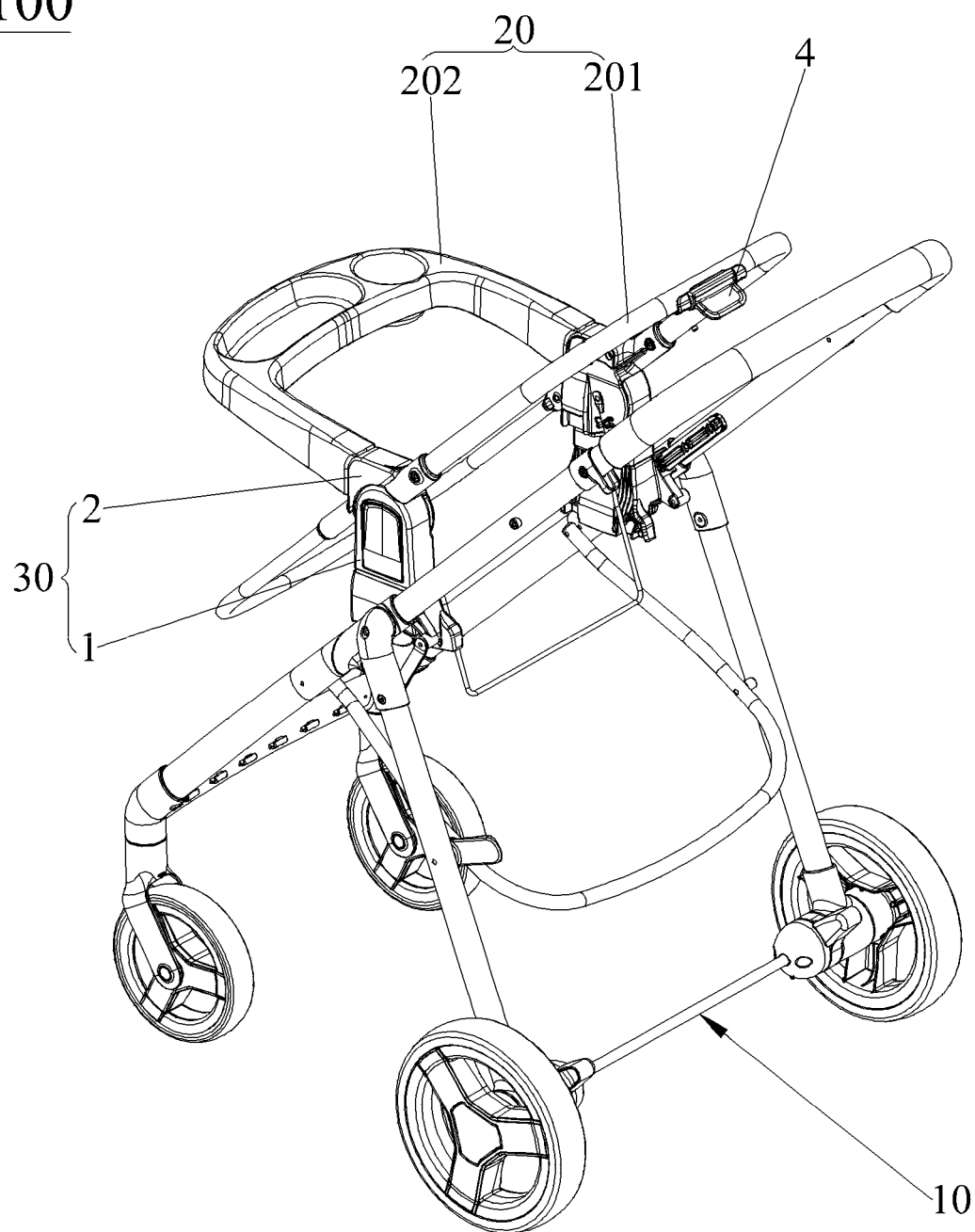
FIG. 1 is a diagram of a stroller according to a preferred embodiment of the present invention.

Please refer FIG. 1, which is a diagram of a stroller 100 according to an embodiment of the present invention. The stroller 100 includes a stroller frame 10, a carrier 20 for holding an infant and a carrier adjusting mechanism 30. Specifically, the carrier 20 includes a backrest tube 201 and a handrail 202. The carrier adjusting mechanism 30 is disposed between the backrest tube 201 and the stroller frame 10. The handrail 202 is disposed on the carrier adjusting mechanism 30. A position of the carrier 20 relative to stroller frame 10 is adjustable via the carrier adjusting mechanism 30 for different postures of the infant in the stroller 100 when taking the infant out.

Figure 7:
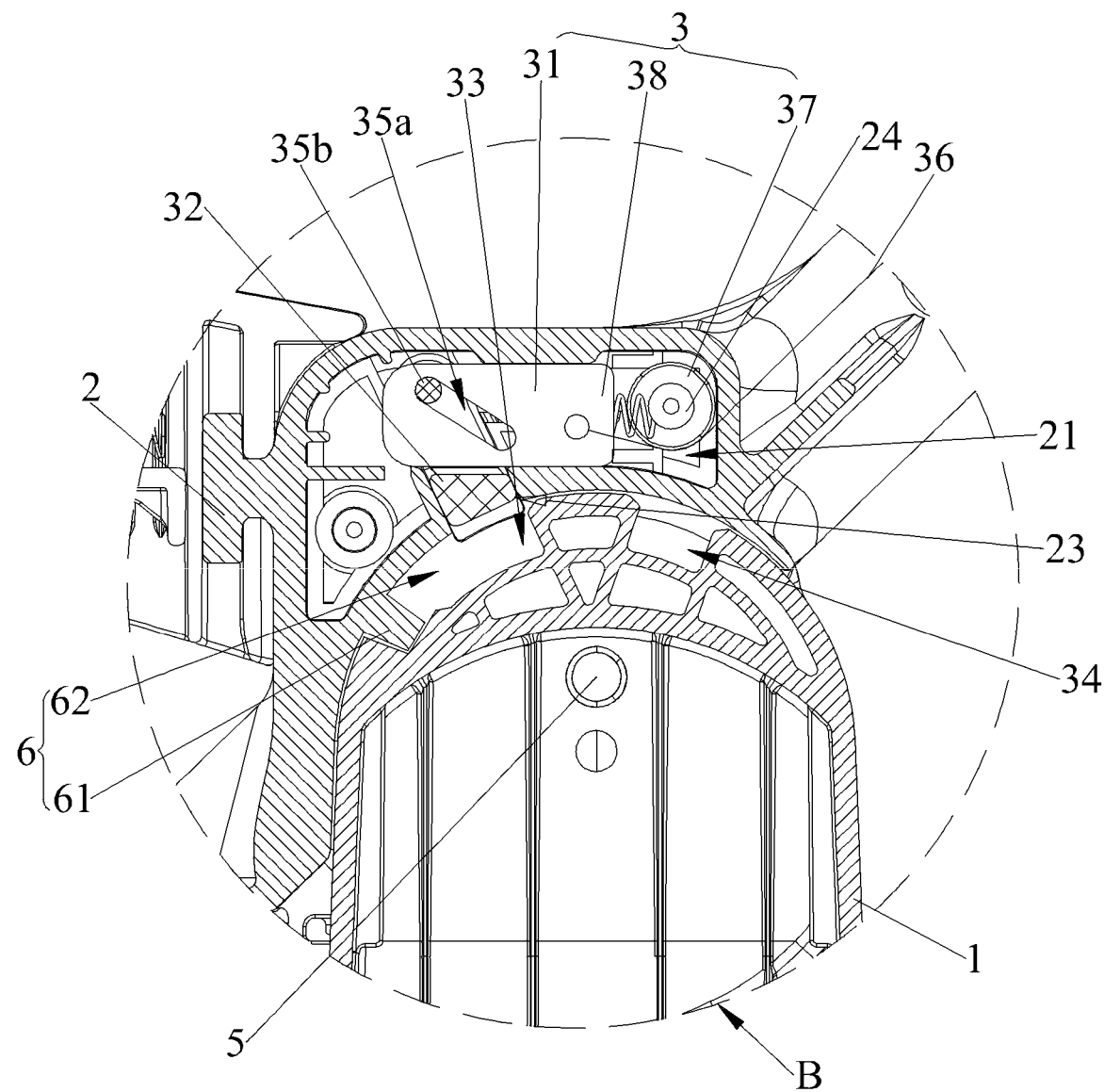
FIG. 7 is an enlarged diagram of "B" region in FIG. 5.
Figure 8:
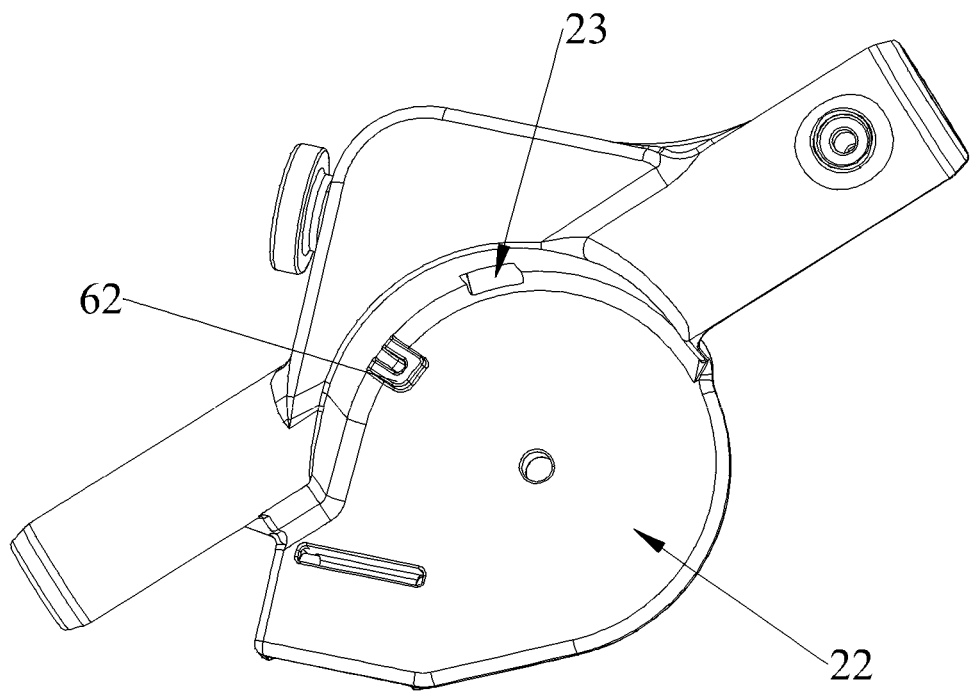
FIG. 8 is a diagram of a locking structure of the carrier adjusting mechanism according to a preferred embodiment of the present invention.
Figure 9:
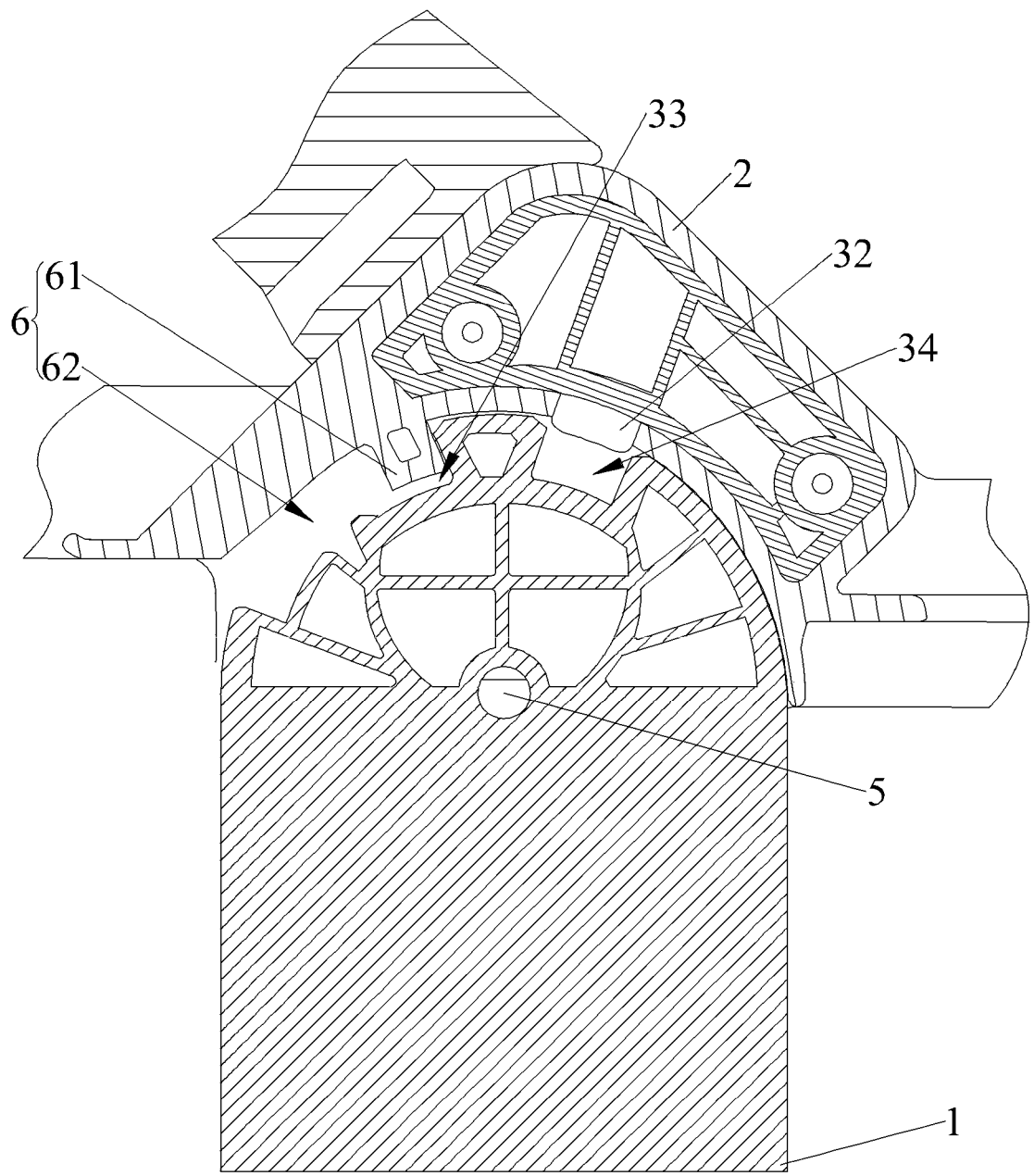
FIG. 9 is a partial cross-sectional diagram of the locking member being aligned with the second engaging structure of the carrier adjusting mechanism according to a preferred embodiment of the present invention.
Figure 10:
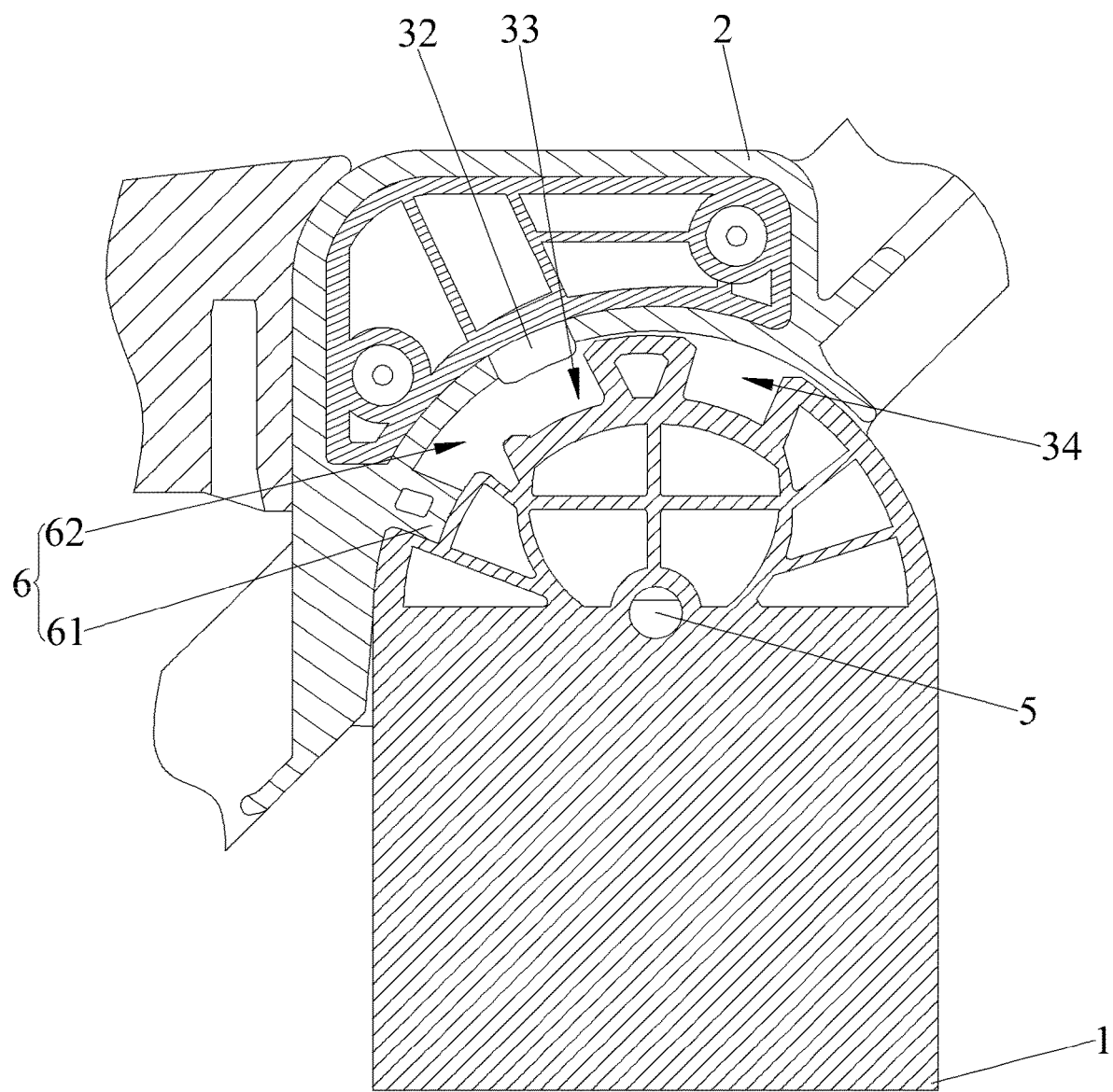
FIG. 10 is a partial cross-sectional diagram of the locking member being aligned with the first engaging structure of the carrier adjusting mechanism according to a preferred embodiment of the present invention.

Please refer to FIG. 2 and FIGS. 4-7. The carrier adjusting mechanism 30 according to a preferred embodiment of the present invention includes a base 1, a locking structure 2, a locking device 3, and a release actuator 4. The base 1 is connected to the stroller frame 10. The locking structure 2 is connected to the backrest tube 201 of the carrier 20 and is pivoted to the base 1 via a shaft 5 to be rotatable at least between a first position and a second position. When the locking structure 2 is located at the first position as shown in FIG. 7, the backrest tube 201 connected to the locking structure 2 is in a horizontal state, and the carrier 20 is in a bassinet mode or a lying mode. When the locking structure 2 is located at the second position as shown in FIG. 8, the backrest tube 201 connected to the locking structure 2 is in an oblique state, and the carrier 20 is in a seat mode. In another embodiment, the locking structure 2 could be rotatable to a third position or a fourth position (but not limited thereto) relative to the base 1 for achieving the multi-stage adjustment purpose, so as to make adjustment of the carrier adjusting mechanism 30 more flexible. The locking device 3 is disposed between the base 1 and the locking structure 2 for selectively locking or releasing the base 1 and the locking structure 2. The release actuator 4 is disposed on the stroller 100 and is connected to the locking device 3. The release actuator 4 selectively drives the locking device 3 to perform the releasing motion, so as to allow the locking structure 2 to move between the first position and the second position together with the backrest tube 201.

As such, when a user operates the release actuator 4 to drive the locking device 3 to perform the releasing motion, the locking structure 2 and the base 1 are released to allow the user to rotate the locking structure 2 relative to the base 1 between the first position and the second position. When the user releases the release actuator 4, the locking device 3 locks the base 1 and the locking structure 2 to stop the locking structure 2 from rotating relative to the base 1 for fixing a position of the carrier 20 relative to stroller frame 100. In the embodiments provided by the present invention, the release actuator 4 could be directly or indirectly connected to the locking device 3. That is, the release actuator 4 could be directly connected to the locking device 3 for switching the locking device 3 to the lock state or the release state, or could be connected to the locking device 3 via other components for driving the locking device 3 to the lock state or the release state by the other components. For example, the release actuator 4 could be integrally connected to the locking device 3 or connected to an exposed component extending from the base 1 or the locking structure 2. Accordingly, the user can exert an external force upon the release actuator 4 to directly move the locking device 3. Specifically, in this embodiment, the release actuator 4 could be a rotation button for the user to rotate. In another embodiment, the release actuator 4 could be a press button or a push button, but the present invention is not limited thereto. The base 1 is detachably assembled with the stroller frame 10 to allow that the user can perform assembly and disassembly of the carrier adjusting mechanism 30 and the stroller frame 10 conveniently for subsequent storage or replacement of the carrier adjusting mechanism 30. Thus, the maintenance cost of the stroller 100 can be reduced.

As shown in FIGS. 3-10, the locking device 3 includes a driving member 31, a locking member 32, a first engaging structure 33, and a second engaging structure 34. In another embodiment, the locking device 3 could further include a third engaging structure and a fourth engaging structure (but not limited thereto). Accordingly, the locking structure 2 could be further fixed to a third position via engagement of the locking structure 2 and the third engaging structure or fixed to a fourth position via engagement of the locking structure 2 and the fourth engaging structure, so as to generate the multi-stage carrier adjusting effect. Furthermore, in another embodiment, the locking device 3 could include a plurality of locking members 32 (e.g. the amount of the locking member 32 could be equal to two, three, or four, but not limited thereto) to make locking of the locking structure 2 more firm and solve the problem that locking of the locking structure 2 fails when the locking member 32 is broken on condition that the locking device 3 only has the locking member 32 disposed therein.

Specifically, in this embodiment, the first engaging structure 33 and the second engaging structure 34 are disposed on the base 1, and the locking member 32 is disposed on the locking structure 2. The locking member 32 is selectively engaged with the first engaging structure 33 to fix the locking structure 2 at the first position or engaged with the second engaging structure 34 to fix the locking structure 2 at the second position. Specifically, in this embodiment, the driving member 31 is movably disposed on the locking structure 2, the locking member 32 is movably disposed on the driving member 31, and the release actuator 4 is connected to the driving member 31 for driving the locking member 32 via the locking member 31 to be disengaged from the first engaging structure 33 or the second engaging structure 34, so as to allow the locking structure 2 to move between the first position and the second position together with the backrest tube 201.

Specifically, in this embodiment, the locking member 32 is a protruding block, and the first engaging structure 33 and the second engaging structure 34 are slot structures for cooperatively forming a top portion of the base 1. Preferably, the locking member 32 is aligned with the first engaging structure 33 when the locking structure 2 is switched to the first position, and the locking member 32 is engaged with the first engaging structure 33 to fix the locking structure 2 at the first position. The locking member 32 is aligned with the second engaging structure 34 when the locking structure 2 is switched to the second position, and the locking member 32 is engaged with the second engaging structure 34 to fix the locking structure 2 at the second position.

It could be understood that configuration of the locking member and the first and second engaging structures is not limited to the aforesaid embodiment. For example, in another embodiment, the first engaging structure 33 and the second engaging structure 34 could be disposed on the locking structure 2 and the locking member 32 could be disposed on the base 1. As such, the locking member 32 on the base 1 could be engaged with the first engaging structure 33 or the second engaging structure 34 on the locking structure 2, so as to achieve the same locking purpose mentioned by the aforesaid embodiment.

As shown in FIGS. 3-7, the release actuator 4 is indirectly connected to the locking device 3. Specifically, in a preferred embodiment, the carrier adjusting mechanism 30 could further include a link member 36. A first end of the link member 36 is fixedly connected to the release actuator 4, and a second end of the link member 36 is fixedly connected to the locking member 32 via the driving member 31. Via connection of the link member 36, mounting of the release actuator 4 can be more flexible and the purpose that the release actuator 4 can remotely operate the locking device 3 can be achieved. It can be understood that the release actuator 4 could be directly connected to the locking member 32 to operate the locking device 3 at a short distance in another embodiment, so that the carrier adjusting mechanism 30 can have a compact design. In another embodiment, the release actuator 4 could be directly or indirectly connected to the second engaging structure 33 and the second engaging structure 34. For example, the first end of the link member 36 could be connected to the release actuator 4 and the second end of the link member 36 could be connected to the first engaging structure 33 and the second engaging structure 34, but the present invention is not limited thereto. Preferably, the carrier adjusting mechanism 30 according to a preferred embodiment of the present invention could further include a guiding structure 37 disposed on the locking structure 2. A portion of the link member 36 located between the release actuator 4 and the locking member 3 is wound on the guiding structure 37. Via guidance of the guiding structure 37, the release actuator 4 can pull the link member 36 more reliably, so as to surely drive the locking device 3 via the link member 36. Preferably, the guiding structure 37 could be a roller, but not limited thereto. The portion of the link member 36 located between the release actuator 4 and the locking member 32 is wound on an external periphery of the roller to reduce the dynamic friction force and the abrasion rate of the link member 36, so as to extend the service life of the link member 36. For example, in this embodiment, the release actuator 4 is disposed at the top end of the backrest tube 201 for the user to conveniently operate. When the user operates the release actuator 4, the user can rotate the backrest tube 201 quickly with one hand, so as to make the releasing and adjusting operations of the carrier adjusting mechanism 30 more smooth for saving the operating time. The mounting position of the release actuator 4 is not limited to the aforesaid embodiments. For avoiding the external interference, the link member 36 could be disposed through the backrest tube 201 and the locking structure 2. Preferably, the link member 36 could be a flexible wire, such as a steel wire or a braided wire, but not limited thereto.

As shown in FIGS. 6-10, the top portion of the base 1 abuts against the locking structure 2. Specifically, the locking structure 2 has a first containing chamber 21, a second containing chamber 22 located under the first containing chamber 21, and a slot 23 communicated with the first containing chamber 21 and the second containing chamber 22. The top portion of the base 1 is disposed in the second containing chamber 22 and abuts against an inner wall of the second containing chamber 22. The driving member 31 is located in the first containing chamber 21. The locking member 32 is disposed through the slot 23. In such a manner, the driving member 31 can drive the locking member 32 to be contained in the first containing chamber 21 for releasing locking between the base 1 and the locking structure 2, and the driving member 31 can drive the locking member 32 to pass through the slot 23 and then be engaged with the first engaging structure 33 or the second engaging structure 34. The aforesaid design can improve the driving reliability of the driving member 31 for the locking member 32 and ensure that the carrier adjusting mechanism 30 can have a simple and compact appearance, but the present invention is not limited thereto. In another embodiment, the locking structure 2 could have only one containing chamber formed therein, and the locking device 2 and the top portion of the base 1 could be located in the containing chamber, meaning that the structural design of the locking structure 2 is not limited to the aforesaid embodiment.

Figure 4:
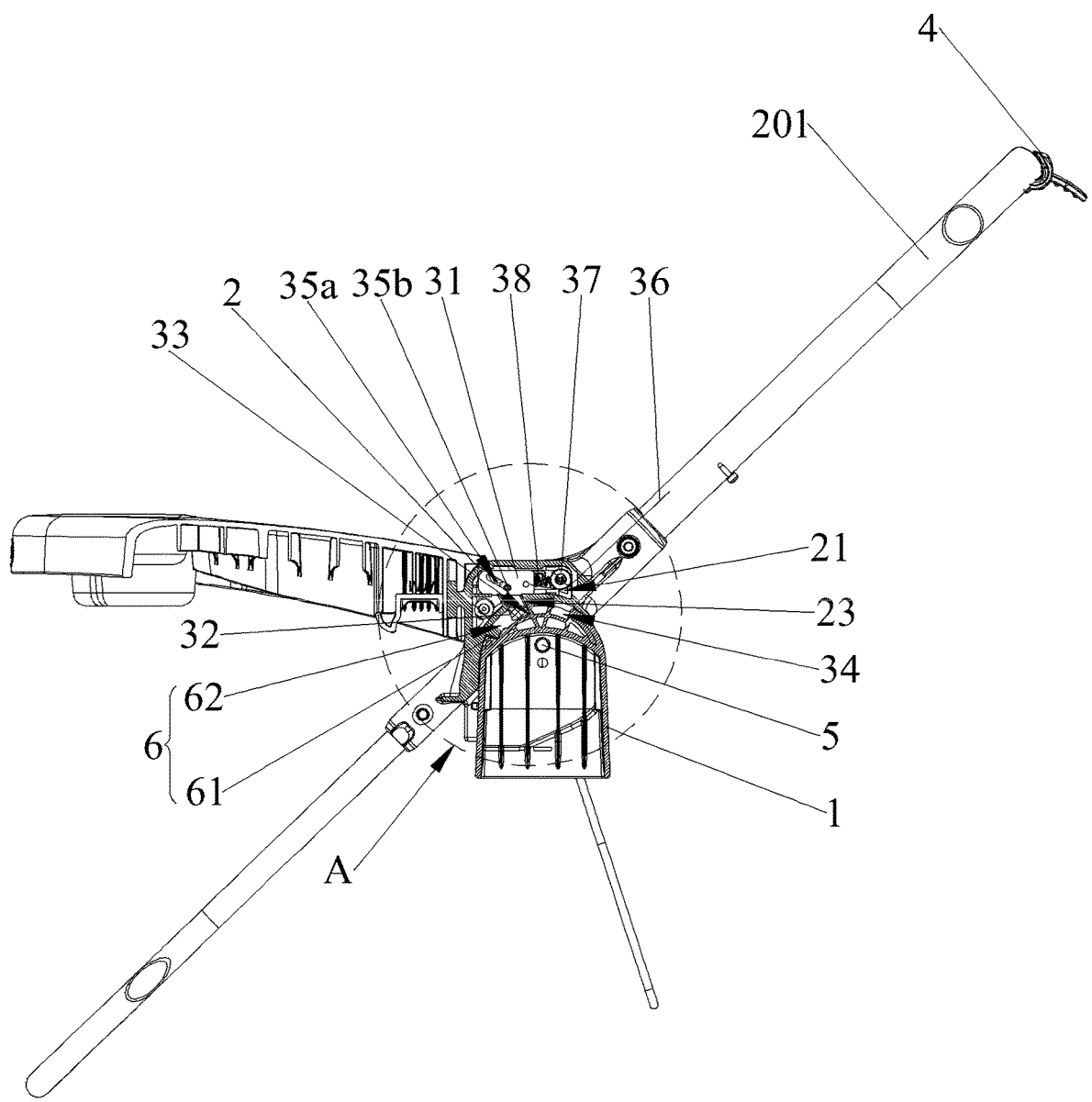
FIG. 4 is a cross-sectional diagram of a locking member being engaged with a first engaging structure of the carrier adjusting mechanism according to a preferred embodiment of the present invention.
Figure 5:
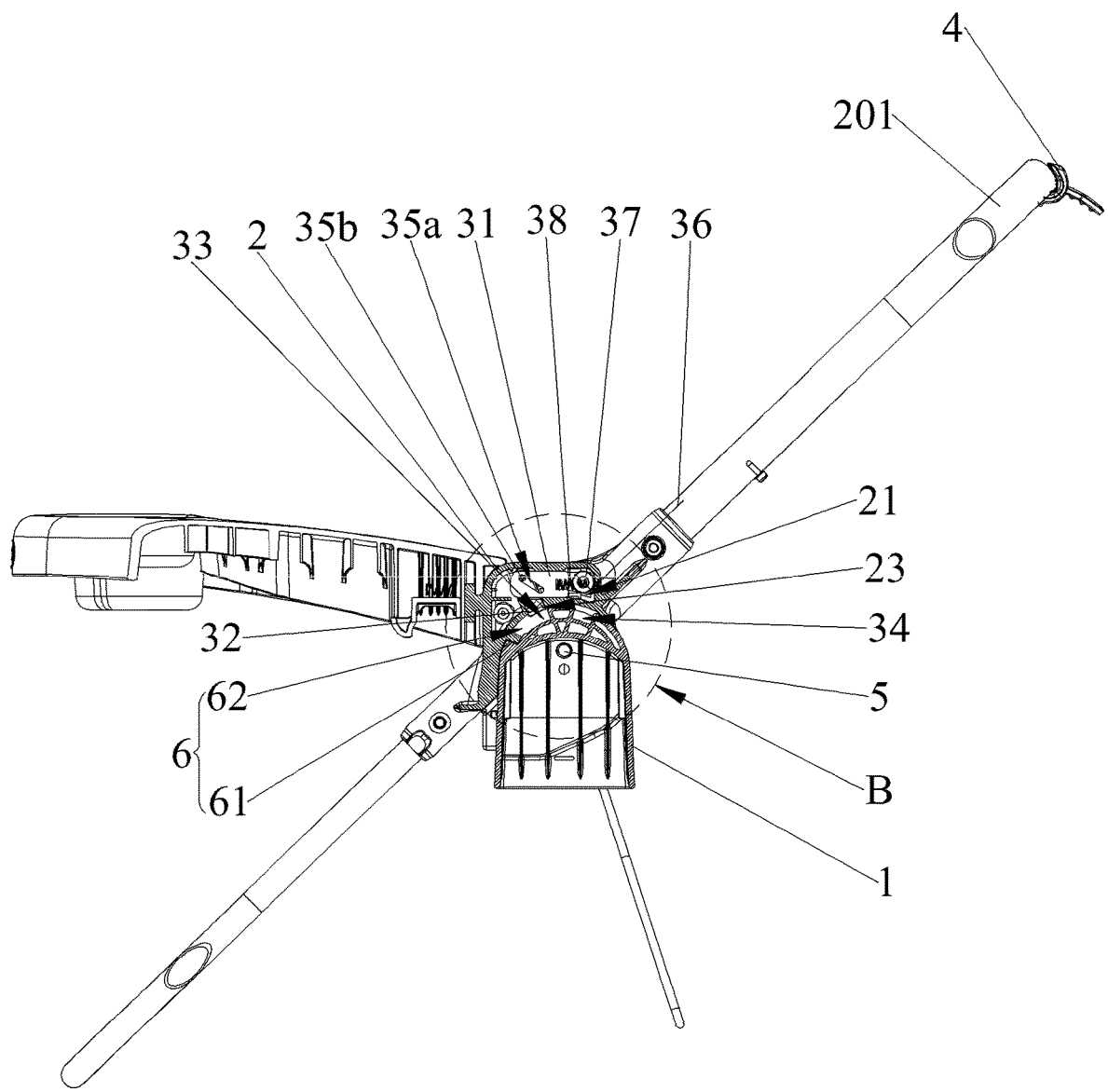
FIG. 5 is a cross-sectional diagram of the locking member being disengaged from a second engaging structure of the carrier adjusting mechanism according to a preferred embodiment of the present invention.
Figure 6:
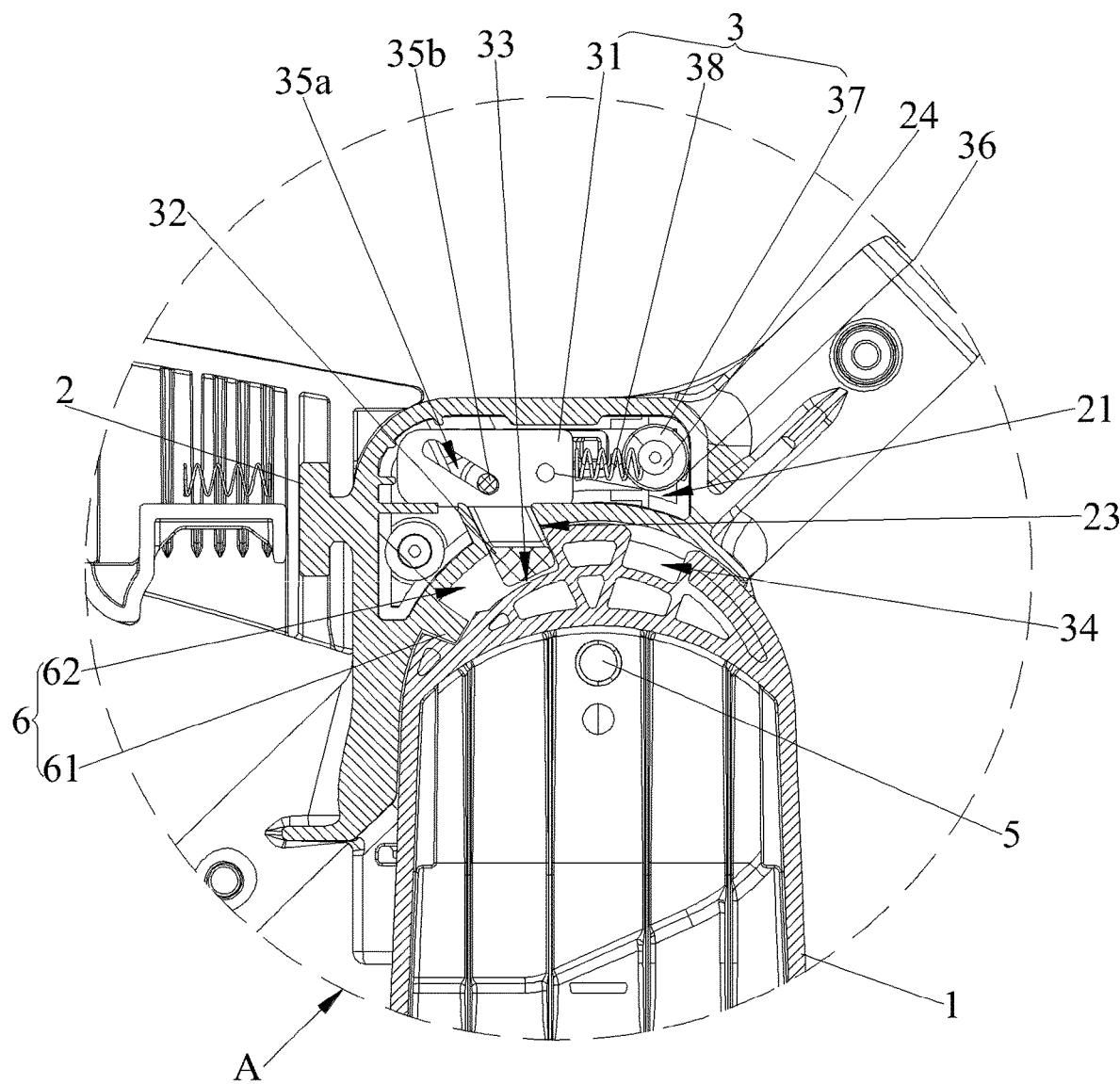
FIG. 6 is an enlarged diagram of "A" region in FIG. 4.

As shown in FIG. 4 and FIG. 7, the driving member 31 and the locking member 32 are slidable relative to each other, and a sliding direction of the driving member 31 is intersected with a sliding direction of the locking member 32. The present invention is not limited to the aforesaid sliding design. That is, in another embodiment, the driving member 31 could be pivoted to the locking member 32 to slide the locking member 32 for achieving the aforesaid purpose that the driving member 31 drives the locking member 32 to release locking between the base 1 and the locking structure 2 or lock the locking structure 2 on the base 1. Specifically, in this embodiment, the driving member 31 has a long slot 35a formed thereon, and the long slot 35a is oblique to the sliding direction of the driving member 31. The locking member 32 has a protruding portion 35b formed thereon. The protruding portion 35b is disposed on the long slot 35a and slides along the long slot 35a. The present invention is not limited to the aforesaid design. That is, in another embodiment, the long slot 35a could be formed on the locking member 32 and could be oblique to the sliding direction of the locking member 32, and the protruding portion 35b could be formed on the driving member 31. As such, the purpose that the driving member 31 drives the locking member 32 to release locking between the base 1 and the locking structure 2 or lock the locking structure 2 on the base 1 can be also achieved. To be more specific, in this embodiment, the long slot 35a could be a linear slot and the protruding portion 35 could be a pillar structure, but the present invention is not limited thereto. For example, the long slot 35a could be an arc-shaped slot in another embodiment.

As shown in FIG. 4 and FIG. 7, the locking device 3 could further include an elastic member 38 disposed between the locking structure 2 and the driving member 31. The elastic member 38 could have a tendency to drive the driving member 31 to be engaged with the first engaging structure 33 or the second engaging structure 34, so that the locking member 32 can be automatically engaged with the first engaging structure 33 or the second engaging structure 34 via the elastic member 38 when the locking member 32 is aligned with the first engaging structure 33 or the second engaging structure 34. Specifically, a first end of the elastic member 38 abuts against a side of the driving member 31 connected to the release actuator 4 and a second end of the elastic member 38 abuts against the locking structure 2 for simplifying the assembly design of the elastic member 38 (but not limited thereto). For making the elastic member 38 abut against the locking structure 2 more firmly, the locking structure 2 could have a protruding pillar 24 for abutting against the second end of the elastic member 38, but not limited thereto. When the user operates the release actuator 4, the driving member 31 can be driven to cause elastic deformation of the elastic member 38. When the user releases the release actuator 4, the elastic member 38 drives the driving member 31 to move the locking member 32 for locking the locking structure 2 on the base 1. Preferably, in this embodiment, the roller is rotatably disposed on the protruding pillar 24 for improving the efficiency of structure space utilization of the locking structure 2.

As shown in FIGS. 6-10, the carrier adjusting mechanism 30 according to a preferred embodiment of the present invention could further include a limiting structure 6 disposed between the locking structure 2 and the base 1 for limiting the rotation range of the locking structure 2 relative to the base 1, so as to help the user know whether the locking structure 2 has been rotated to a desired position or not. Specifically, the limiting structure 6 includes a convex portion 61 disposed on the locking structure 2 and a concave portion 62 disposed on the base 1. As such, the convex portion 61 can abut against a side wall of the concave portion 62 when the locking structure 2 is rotated to the first position, and the convex portion 61 can abut against another side wall of the concave portion 62 when the locking structure 2 is rotated to the second position. The present invention is not limited to the aforesaid limiting design. In another embodiment, the convex portion 61 could be disposed on the base 1, and the concave portion 62 could be disposed on the locking structure 2. Accordingly, the side wall of the concave portion 62 on the locking structure 2 can abut against the convex portion 61 when the locking structure 2 is rotated to the first position, and the side wall of the concave portion 62 can abut against the convex portion 61 when the locking structure 2 is rotated to the second position. In such a manner, the limiting structure 6 can still limit the rotation range of the locking structure 2 relative to the base 1. To be more specific, the concave portion 62 could be a slot structure extending axially along a rotation direction of the locking structure 1 (but not limited thereto), and the convex portion 61 could be a rib structure (but not limited thereto). Preferably, the concave portion 62 and the first engaging structure 33 could be formed on the top portion of the base 1 and could be overlapped with each other, meaning that the first engaging structure 33 is located at an end of the concave portion 62 for further saving the top space of the base 1, so as to improve the efficiency of internal space utilization of the base 1.

Figure 2:
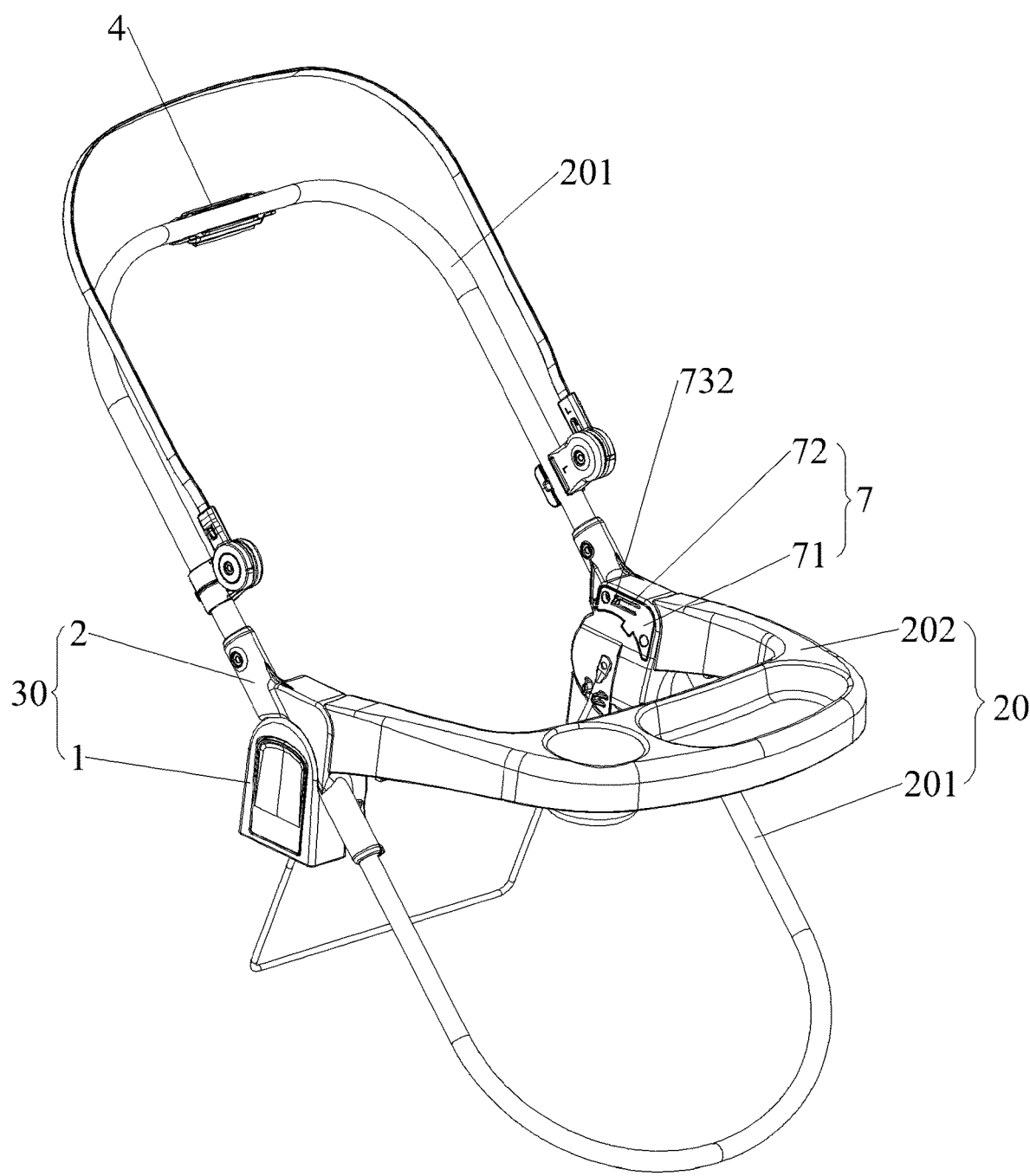
FIG. 2 is a diagram of the stroller omitting a stroller frame according to a preferred embodiment of the present invention.
Figure 3:
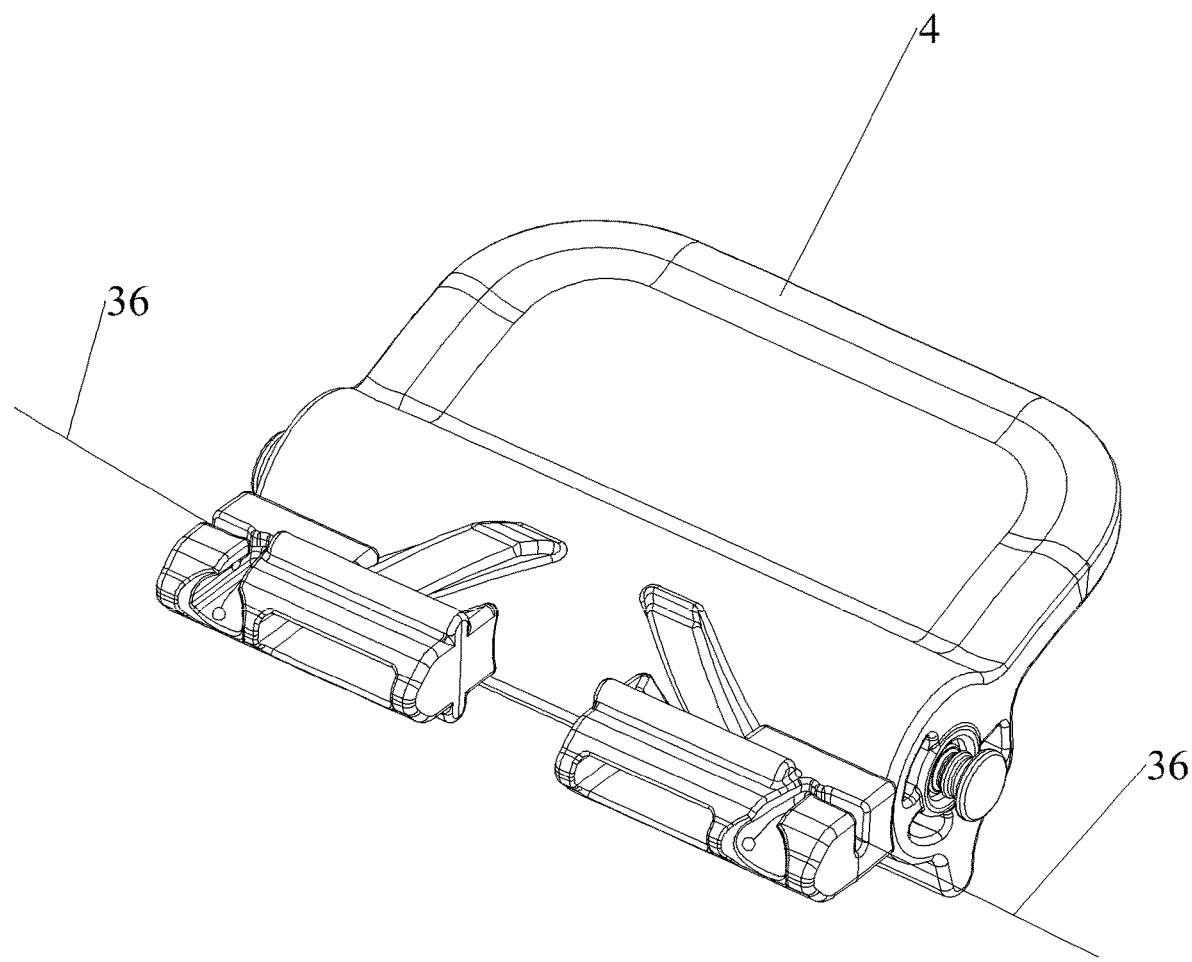
FIG. 3 is an assembly diagram of a release actuator and a link member of a carrier adjusting mechanism according to a preferred embodiment of the present invention.
Figure 11:
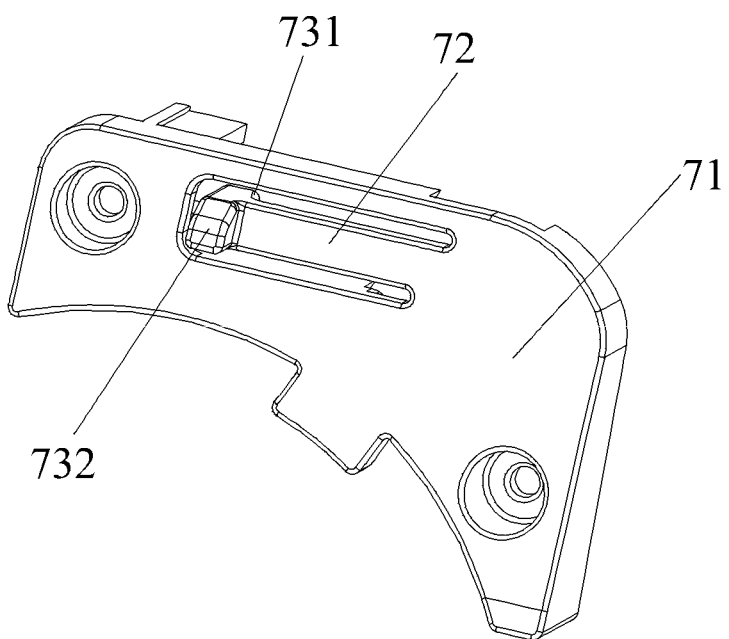
FIG. 11 is a diagram of a blocking member of the carrier adjusting mechanism according to a preferred embodiment of the present invention.
Figure 12:
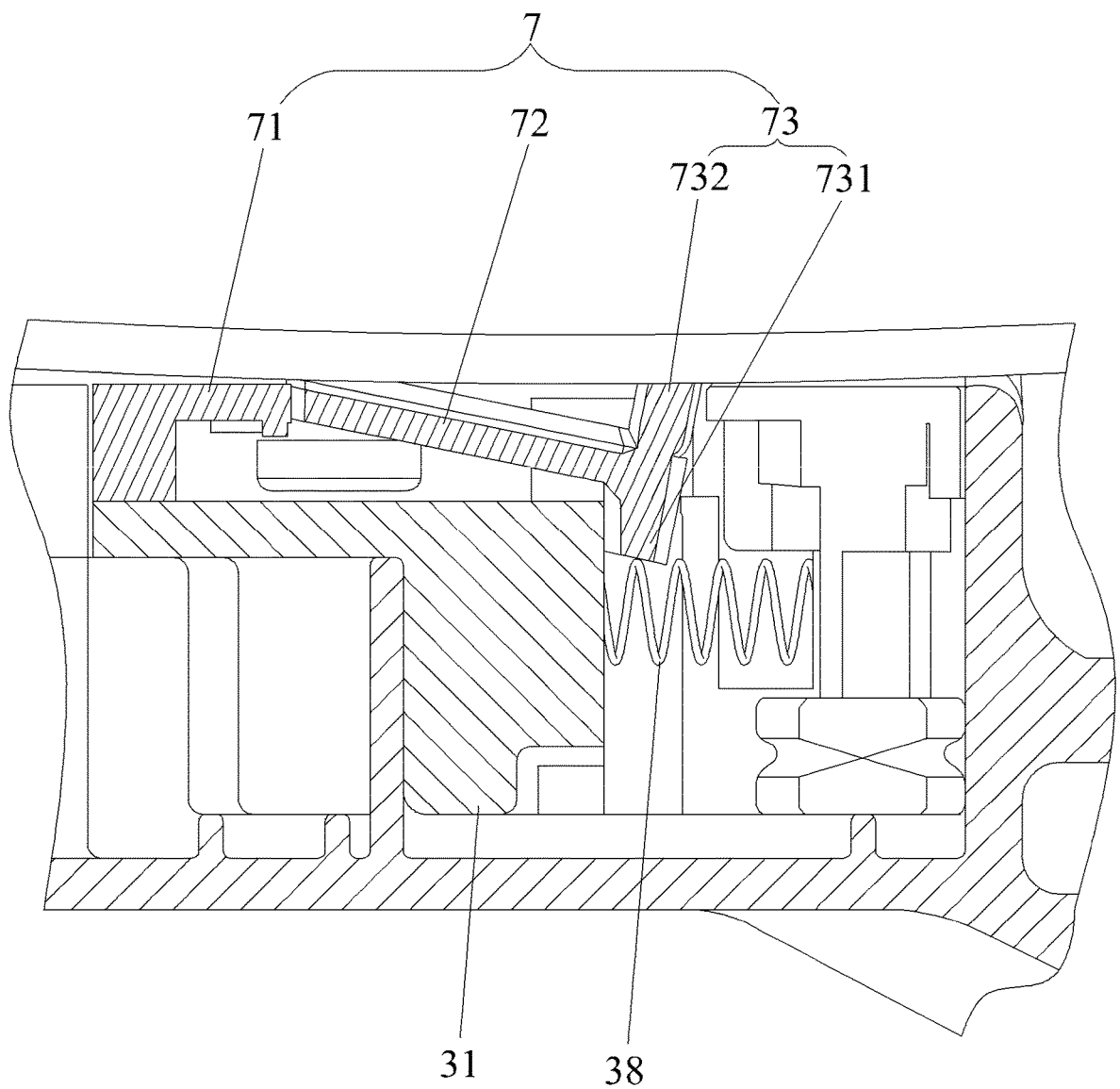
FIG. 12 is a top-view cross-sectional diagram of a blocking member of the carrier adjusting mechanism along a top portion of the locking structure according to a preferred embodiment of the present invention.

As shown in FIG. 2, FIG. 11, and FIG. 12, the carrier adjusting mechanism 30 according to a preferred embodiment of the present invention could further include a blocking member 7. The blocking member 7 is movable between a blocking position and a releasing position relative to the locking structure 2. The blocking member 7 blocks the locking device 3 from performing the releasing motion when being located at the blocking position, and more specifically, the blocking member 7 blocks the driving member 31 from driving the locking member 32 to perform the releasing motion as shown in FIG. 12. Specifically, during the process of an expansion device being engaged with the carrier 20, the blocking member 7 is pushed from the releasing position to the blocking position. That is, when the carrier 20 of the present invention is not engaged with the expansion device, the blocking member 7 is located at the releasing position. For example, the expansion device could be a safety seat or a diaper table, but not limited thereto. To be more specific, the blocking member 7 is located at a side of the locking structure 2 opposite to the base 1, and the blocking member 7 moves toward the locking device 3 when being pushed from the releasing position to the blocking position. For example, the blocking member 7 could include a board 71 mounted on the locking structure 2, an elastic arm 72 formed on the board 71, and a blocking head 73 protruding from the elastic arm 72. The elastic arm 72 has a tendency to drive the blocking head 73 to the releasing position. That is, when the expansion device is engaged with the carrier 20, the elastic arm 72 deforms elastically toward the locking device 3 to drive the blocking head 73 to the blocking position for blocking the locking device 3, and more specifically, for blocking the driving member 31 (but not limited thereto, meaning that in another embodiment, the blocking head 73 could be utilized to block the locking member 32). When the expansion device is disengaged from the carrier 20, the elastic arm 72 automatically returns to its original position to drive the blocking head 73 to the releasing position. Preferably, a first end 731 of the blocking head 73 protrudes from the elastic arm 72 toward the locking device 3, and a second end 732 of the blocking head 73 protrudes away from the locking device 3. As such, the blocking head 7 can block the driving member 31 when the expansion device is engaged with the carrier 20, so as to ensure blocking reliability of the blocking member 7. Preferably, when the blocking head 73 is located at the blocking position, the first end 731 of the blocking head 73 blocks an end of driving member 31 connected to the release actuator 4. In another embodiment, the blocking member 7 is slidably disposed through the locking structure 2 to be slidable between the releasing position and the blocking position.

It should be mentioned that at least one of the driving member 31, the link member 36, the elastic member 38, the limiting structure 6, and the blocking member 7 could be omitted according to the practical application of the present invention.

The adjusting design for the stroller 100 and the carrier adjusting mechanism 30 of the present invention is described as follows with the aforesaid drawings. When the user operates the release actuator 4 to slide the driving member 31 via the link member 32, the driving member 31 is disengaged from the first engaging structure 33 or the second engaging structure 34, so that the locking structure 2 can be rotatable relative to the base 1. Subsequently, the user can rotate the backrest tube 201, and then the locking structure 2 can rotate to the first position or the second position with the backrest tube 201. During rotation of the locking structure 2, the convex portion 61 abuts against the concave portion 62 when the locking member 32 is aligned with the first engaging structure 33 or the second engaging structure 34. At this time, the user can release the release actuator 4, and then the elastic member 38 can slide the driving member 31 for driving the locking member 32 to be engaged with the first engaging structure 33 or the second engaging structure 34, so as to lock the locking structure 2 on the base 1. When the expansion device is engaged with the carrier 20, the blocking member 7 is accordingly switched to the blocking position for blocking the driving member 31, so as to lock the carrier 20.

Compared with the prior art, the carrier adjusting mechanism 30 of the present invention adopts the design in which the locking device 3 is disposed between the base 1 and the locking structure 2 for locking the locking structure 2 on the base 1 or releasing the locking structure 2 from the base 1 via linkage of the release actuator 4, the base 1, the locking structure 2, and the locking device 3. The locking device 3 includes the locking member 32, the first engaging structure 33, and the second engaging structure 34, and the locking member 32 is selectively engaging with the first engaging structure 33 or the second engaging structure 34 to lock the locking structure 2 on the base 1. The release actuator 4 is connected to the locking device 3 for driving the locking member 32 to be disengaged from the first engaging structure 33 or the second engaging structure 34, so as to release the locking structure 2 from the base 1. Since the locking structure 2 is pivoted to the base 1 via the shaft 5 to be rotatable at least between the first position and the second position relative to the base 1, a position of the carrier 20 can be adjusted via rotation of the locking structure 2 together with the backrest tube 201 relative to the base 1 after the locking structure 2 is released from the base 1. In summary, the stroller 100 of the present invention adopts the design in which the carrier adjusting mechanism 30 is disposed between the stroller frame 10 and the backrest tube 201 of the carrier 20, the base 1 is disposed on the stroller frame 10, and the locking structure 2 is connected to the backrest tube 201 of the carrier 20, so as to allow that the user can exert force upon the carrier 20 to rotate the locking structure 2 to the first position or the second position relative to the base 1 when the locking structure 2 is released from the base 1. As such, the carrier 20 can be switched to the seat mode or the bassinet mode according to different postures of the infant in the stroller 100. Furthermore, since the carrier 20 can be switched to the seat mode or the bassinet mode via the carrier adjusting mechanism 30 without replacing the carrier 20, the present invention can improve the operational convenience of the stroller 100.

It should be mentioned that the base 1 could be an internal cover and the locking structure 2 could be an external cover (but not limited thereto), so as to make assembly of the base 1 and the locking structure 2 more compact.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A carrier adjusting mechanism applied to a stroller comprising a stroller frame and a carrier, the carrier comprising a backrest tube, the carrier adjusting mechanism being disposed between the stroller frame and the backrest tube to make the backrest tube rotatable for switching the carrier at least to a seat mode or a bassinet mode, the carrier adjusting mechanism comprising:

a base connected to the stroller frame;

a locking structure connected to the backrest tube of the carrier and pivoted to the base to be rotatable at least between a first position and a second position relative to the base;

a locking device disposed between the base and the locking structure, the locking device comprising a first engaging structure, a second engaging structure, and a locking member, the first engaging structure and the second engaging structure being disposed on one of the base and the locking structure, the locking member being disposed on the other of the base and the locking structure, the locking member being selectively engaged with the first engaging structure to fix the locking structure at the first position or engaged with the second engaging structure to fix the locking structure at the second position; and a release actuator disposed on the stroller and connected to the locking device, for driving the locking member to be disengaged from the first engaging structure or the second engaging structure, so as to allow the locking structure to move between the first position and the second position together with the backrest tube of the carrier.

2. The carrier adjusting mechanism of claim 1, wherein a top portion of the base abuts against the locking structure, the locking member is a protruding block, and the first engaging structure and the second engaging structure are slot structures for cooperatively forming the top portion of the base.

3. The carrier adjusting mechanism of claim 1, wherein the release actuator is connected to the locking device via a link member, a first end of the link member is fixedly connected to the release actuator, and a second end of the link is fixedly connected to the locking member.

4. The carrier adjusting mechanism of claim 3 further comprising:

a guiding structure disposed on the locking structure, a portion of the link member located between the release actuator and the locking member being disposed around the guiding structure.

5. The carrier adjusting mechanism of claim 4, wherein the guiding structure is a roller, and the portion of the link member located between the release actuator and the locking member is wound on an external periphery of the roller.

6. The carrier adjusting mechanism of claim 3, wherein the release actuator is disposed on a top end of the backrest tube of the carrier, and the link member is disposed through the backrest tube and the one of the locking structure and the base.

7. The carrier adjusting mechanism of claim 1, wherein the locking device further comprises a driving member disposed in the locking structure or the base, the locking member is movably disposed on the driving member, the release actuator is connected to the driving member, and the release actuator drives the locking member via the driving member to be disengaged from the first engaging structure or the second engaging structure.

8. The carrier adjusting mechanism of claim 7, wherein the driving member and the locking member are slidable relative to each other, and a sliding direction of the driving member is intersected with a sliding direction of the locking member.

9. The carrier adjusting mechanism of claim 8, wherein a long slot is formed on one of the driving member and the locking member and is oblique relative to the sliding direction of the one of the driving member and the locking member, the other of the driving member and the locking member has a protruding portion, and the protruding portion is slidably disposed in the long slot.

10. The carrier adjusting mechanism of claim 9, wherein the long slot is a linear slot, and the protruding portion is a pillar structure.

11. The carrier adjusting mechanism of claim 7, wherein the locking device further comprises an elastic member disposed between the driving member and the one of the locking structure and the base, and the elastic member has a tendency to drive the driving member to be engaged with the first engaging structure or the second engaging structure.

12. The carrier adjusting mechanism of claim 11, wherein a first end of the elastic member abuts against a side of the driving member connected to the release actuator, and a second end of the elastic member abuts against the one of the locking structure and the base.

13. The carrier adjusting mechanism of claim 12, wherein the one of the locking structure and the base has a protruding pillar, and the protruding pillar abuts against the second end of the elastic member.

14. The carrier adjusting mechanism of claim 1 further comprising:
a limiting structure disposed between the locking structure and the base for limiting a rotation range of the locking structure relative to the base.

15. The carrier adjusting mechanism of claim 14, wherein the limiting structure comprises a convex portion disposed on the one of the locking structure and the base and a concave portion disposed on the other of the locking structure and the base, the convex portion abuts against a side wall of the concave portion when the locking structure moves to the first position, and the convex portion abuts against another side wall of the concave portion when the locking structure moves to the second position.

16. The carrier adjusting mechanism of claim 15, wherein the concave portion is a slot structure extending in a rotation direction of the locking structure, and the convex portion is a rib structure.

17. The carrier adjusting mechanism of claim 16, wherein the concave portion and the first engaging structure cooperatively form the top portion of the base and are overlapped with each other.

18. The carrier adjusting mechanism of claim 1 further comprising:
a blocking member disposed on the locking structure and movable relative to the locking structure between a blocking position and a releasing position, the blocking member blocking the locking device from performing a releasing motion when the blocking member is located at the blocking position.

19. The carrier adjusting mechanism of claim 18, wherein the blocking member comprises a board disposed on the locking structure, an elastic arm formed on the board, and a blocking head protruding from the elastic arm, and the elastic arm has a tendency to drive the blocking head to the releasing position.

20. The carrier adjusting mechanism of claim 18, wherein the blocking member is pushed from the releasing position to the blocking position when an expansion device is engaged with the carrier.

21. The carrier adjusting mechanism of claim 20, wherein the expansion device is a safety seat or a diaper table.

22. The carrier adjusting mechanism of claim 20, wherein the blocking member moves toward the locking device when moving from the releasing position to the blocking position.

23. The carrier adjusting mechanism of claim 19, wherein a first protruding end of the blocking head extends close to the locking device, and a second protruding end of the blocking head extends away from the locking device.

24. The carrier adjusting mechanism of claim 20, wherein the blocking member is slidably disposed through the locking structure.

25. The carrier adjusting mechanism of claim 1, wherein the release actuator is a rotation button, a press button, or a push button.

26. The carrier adjusting mechanism of claim 1, wherein the base is directly connected to the stroller frame or is connected to the stroller frame via an adapting structure on the stroller frame.

27. A stroller comprising:
a stroller frame;
a carrier comprising a backrest tube for holding an infant; and
a carrier adjusting mechanism being disposed between the stroller frame and the backrest tube to make the backrest tube rotatable for switching the carrier at least to a seat mode or a bassinet mode, the carrier adjusting mechanism comprising:
a base connected to the stroller frame;
a locking structure connected to the backrest tube of the carrier and pivoted to the base to be rotatable at least between a first position and a second position relative to the base;
a locking device disposed between the base and the locking structure, the locking device comprising a first engaging structure, a second engaging structure, and a locking member, the first engaging structure and the second engaging structure being disposed on one of the base and the locking structure, the locking member being disposed on the other of the base and the locking structure, the locking member being selectively engaged with the first engaging structure to fix the locking structure at the first position or engaged with the second engaging structure to fix the locking structure at the second position; and
a release actuator disposed on the stroller and connected to the locking device, for driving the locking member to be disengaged from the first engaging structure or the second engaging structure, so as to allow the locking structure to move between the first position and the second position together with the backrest tube of the carrier.

28. The stroller of claim 27, wherein the base is detachably disposed on the stroller frame.

* * * * *